United States Patent [19]

Hale

[11] Patent Number: 4,681,486
[45] Date of Patent: Jul. 21, 1987

[54] TRIANGULAR CUTTING TOOL INSERT HAVING CUTTING EDGES WITH RECESSES

[75] Inventor: Alan A. Hale, Berkhamsted, England

[73] Assignee: General Electric Company, Schenectady, N.Y.

[21] Appl. No.: 897,241

[22] Filed: Aug. 18, 1986

[30] Foreign Application Priority Data

Aug. 21, 1985 [GB] United Kingdom ............. 8520901

[51] Int. Cl.[4] ............................................ B23B 27/22
[52] U.S. Cl. ......................................................... 407/114
[58] Field of Search ................ 407/113, 114, 115, 116

[56] References Cited

U.S. PATENT DOCUMENTS

| Re. 30,908 | 4/1982 | Friedline et al. | 407/114 |
|---|---|---|---|
| 3,137,917 | 6/1964 | Dowd | 407/114 |
| 3,187,406 | 6/1965 | Franko | 407/114 |
| 3,574,911 | 4/1971 | Penoyar | 407/114 |
| 3,636,602 | 1/1972 | Owen | 407/113 |
| 3,875,631 | 4/1975 | Malwchak | 407/114 |
| 4,068,976 | 1/1978 | Friedline | 407/114 |
| 4,140,431 | 2/1979 | Friedline et al. | 407/114 |
| 4,248,553 | 2/1981 | Kraemer | 407/114 |
| 4,531,864 | 7/1985 | Bylund | 407/114 |

FOREIGN PATENT DOCUMENTS

| 1237538 | 6/1971 | United Kingdom . | |
|---|---|---|---|
| 1537177 | 12/1978 | United Kingdom . | |
| 2008008 | 5/1979 | United Kingdom . | |
| 2054427 | 2/1981 | United Kingdom | 407/114 |

Primary Examiner—Nicholas P. Godici
Assistant Examiner—Jerry Kearns
Attorney, Agent, or Firm—Arthur E. Bahr; Ernest F. Chapman

[57] ABSTRACT

A three-sided indexable, detachable insert having a positive rake for a cutting tool. The insert has three edge faces and two side faces, each edge face having one or more recesses which extend across the whole of the edge face, substantially transversely to the cutting edge formed where each edge face meets one of the side faces of the insert. The recesses are spaced apart from a plurality of coplanar lands, the number of recesses on each edge face being the same. The width of the recesses is the same as half the width or less than half the width of the intervening lands. Each intervening land is positioned such that is provides in operation a cutting edge to wipe the material left by the recesses of any of the other sides. Each edge face and cutting edge of the triangular insert having a positive rake is designed to have recesses and lands in positions such that when two or more of the inserts are placed side by side, the lands of one or more inserts are in complementary registry with the recesses in at least one other insert. This presents a continuous but staggered line of cutting edge lands when the inserts are positioned in a milling cutter.

13 Claims, 2 Drawing Figures

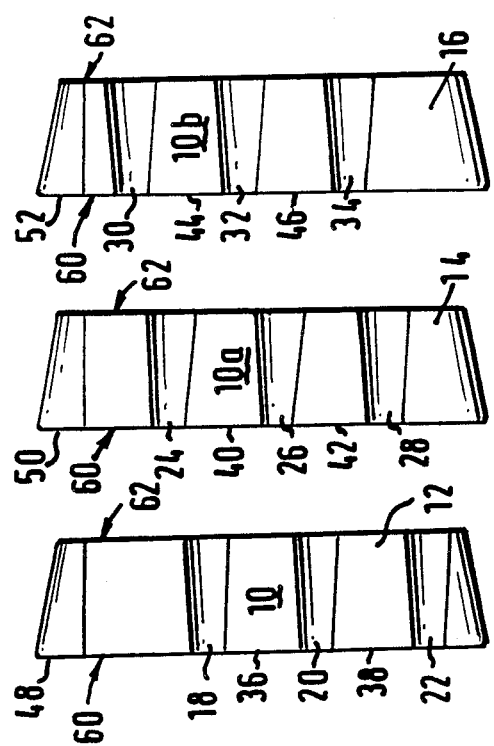
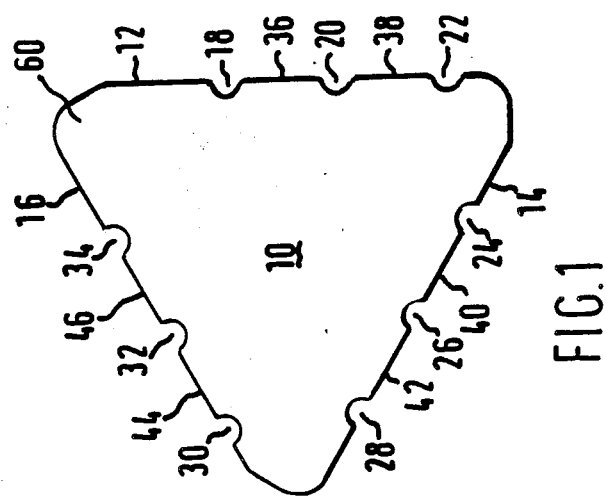

TRIANGULAR CUTTING TOOL INSERT HAVING CUTTING EDGES WITH RECESSES

BACKGROUND OF THE INVENTION

The present invention relates to inserts for cutting tools, and more particularly to serrated triangular cutting tool inserts of the type adapted to be detachably inserted in a holder.

Conventional cutting tools often have straight cutting edges. It has been found that the energy needed to operate cutting tools can be reduced by having interruptions in the cutting edge so that one blade or insert of a cutter does not completely cut through the stock presented to it. A second insert following the first in the cutting tool, will remove the stock not removed by the first cutting insert. Inserts of this type generally have four similar cutting edges, and these cutting edges must be indexed by marking the edges differently to ensure correct arrangement in the cutting tool.

United Kingdom Pat. No. 1,237,538 (U.S. Pat. No. 3,636,602) describes cutting inserts of various geometrical shapes having cutting edges in which recesses extend transversely along the edge face from the side face. The recesses on each edge face are asymmetrically disposed about the center of the face so that each recess on one side of the face is paired with a land on the other side of the face. To ensure proper wiping of the stock being cut, the inserts must be carefully arranged in the cutter such that first one cutting edge is presented to the stock and then the opposing cutting edge is presented in the adjacent insert. The inserts of U.K. Pat. No. 1,237,538 may have an out-of-phase relationship of the cutting edges when mounted at spaced-apart locations on a holder to reduce power consumption and heat generated, however it is desirable to further reduce these factors.

In United Kingdom Pat. No. 1,537,177, a cutting insert which is polygonal in shape and has two parallel faces connected by peripheral walls is described. There are spaced parallel grooves between the cutting edges. The number of grooves on one side is different from the number of grooves on an adjacent side.

United Kingdom Pat. Application No. 2,008,008A describes an insert having parallel faces with peripheral walls, and in the peripheral walls recesses interrupt the cutting edges.

United Kingdom Pat. No. 2,054,427 describes an assembly having a detachable positive rake insert for a cutting tool having three or more contiguous edge faces of equal length and two side faces each edge face having one or more recesses which extend across the whole of the edge face and which extend transversely or substantially transversely to the cutting edge formed where each edge face meets one of the side faces of the blade, the recesses being spaced apart to leave a plurality of coplanar lands, the number of recesses on any two adjacent edge faces being different, the recess at the cutting edge having a width which is the same as or less than the width of the intervening lands at the cutting edge, which recess increases in width as it extends away from its cutting edge. This insert operates entirely satisfactorily but is difficult to index when the insert has other than four edges. The inserts described in United Kingdom Pat. No. 1,237,538 function because they have 90° angles between edge faces and side faces (negative rake inserts) which makes it possible to index the inserts correctly by using both side faces to achieve recess overlapping.

The inserts described in United Kingdom Patent No. 2,054,427 function because they are single sided in operation (positive rake) with the angle between the top face and any side face being less than 90°. Indexing is achieved in this case due to pairs of faces having different numbers of recesses.

Indexing becomes a particular problem when a positive rake triangular insert is used, and it is desirable to overcome this problem. Furthermore, it is desirable to improve inserts so that there is a reduction or avoidance of shock and a reduction in power consumption and heat generated.

SUMMARY OF THE INVENTION

Accordingly, it is an object of the present invention to provide inserts having improved cutting edges with recesses.

It is another object of the present invention to provide triangular inserts which overcome the indexing problems of the prior art inserts.

Another object of the present invention is to provide improved, triangular positive rake inserts.

Still another object of the present invention is to provide triangular inserts having recesses therein which reduce power consumption and heat generated.

In accordance with the foregoing objects, the present invention overcomes indexing problems, particularly when applied to a triangular insert, and more particularly to a triangular positive rake insert.

The present invention provides an indexable, detachable insert for a cutting tool having three contiguous edge faces of equal length and two side faces, each edge face having a cutting edge with one or more recesses which extend across the whole of the edge face and which extend transversely or substantially transversely to the cutting edge formed where each edge face meets one of the side faces of the insert, the recesses being spaced apart to leave a plurality of coplanar lands, the number of recesses on the edge faces being the same, the recess at the cutting edge having a width which is the same as half the width, or less than half the width, of the intervening lands at the cutting edge, each intervening land of any two sides being positioned such that it provides in operation a cutting edge to wipe the material left by the recesses of the third side.

The above described insert for a cutting tool is suitable for positive rake configurations. Any positive rake may be adopted, the usual rake angles being according to international standards with the positive rake being generally about 7° to about 20°, and more preferably about 10° or 11°.

The cutting insert has three contiguous edge faces of equal length. When these edges are blunted, each insert can be temporarily removed from the holder and rotated until an adjacent fresh edge is in position. As each of these is adjusted in turn, it can easily be seen which insert has been turned and which inserts are still to be turned. In the inserts of the present invention, the lands on at least one side are positioned such that a complete cutting edge is formed with the lands on at least one other side. Thus, by arranging the inserts in a milling cutter, the lands of two or more edges are aligned out-of-phase, and the lands on one cutting edge overlie at least some of the recesses of another cutting edge. The inserts of the present invention have cutting edge configurations designed in such a manner that if two or more inserts are positioned side-by-side, the cutting edges of two or more of the inserts cooperate to define a substantially linear cutting edge.

In the most preferred embodiment of the present invention, the positive rake inserts are designed in such a manner that each intervening land at the cutting edge of any two sides is positioned to provide, in operation in a milling cutter, a cutting edge to wipe the material left by the recesses of a third side of the triangular positive rake insert. In this way, scoring is prevented on the workpiece presented to the milling cutter. This is because any scoring which occurs from the edge of the land of one insert would be removed by the land of the next insert or inserts by the rotating milling cutter. The effect of the recesses is to interrupt the edge face, and the length of the interruption should be the same as or less than the length of the resultant lands to ensure complete wiping of the stock in any two adjacent inserts arranged in a cutting tool.

The inserts of this invention can be used on any cutter bodies which at present accepts conventional inserts. The inserts may be made to any standard or required sizes.

The main benefits of the present invention when compared to conventional inserts without recesses, are that the serrated edges, that is, the lands and recesses, break up the cut thereby reducing the power consumption required of the cutting as a whole as well as reducing the tendancy for the workpiece to vibrate. This in turn allows a better insert life and a better wear resistance of the insert. The inserts can be used on any milling applications where normal surface finish is required. The reduction of power consumption is generally between 8% and 12% as compared with conventional insert means so that either a lower powered milling machine may be used, or for the same output a deeper cut may be made. The main benefits of the present invention when compared with the inserts described in United Kingdom Pat. No. 2,054,427 are that triangular inserts for the first time are easily indexable and can be used in cutters having any number of insert pockets whereby all edges of the inserts can be used. Additional advantages are also realized by the positive rake configurations of the serrated triangular inserts.

The cutting inserts may be made of any of the conventional materials currently used for cutting inserts. These include, for example, tungsten carbide, titanium carbide, tantalum carbide, high speed steel, cemented carbides such as those carbides of a metal of Groups IVb, Vb and VIb of the periodic table of elements, cemented or bonded by iron, nickel or cobalt, for example titanium carbide, tungsten carbide or tantalum carbide in an iron, nickel or cobalt matrix. Cermets and solid ceramics may also be used as may inserts coated with carbides or ceramics such as aluminium oxide or zirconium oxide.

BRIEF DESCRIPTION OF THE DRAWINGS

The present invention will be further described by way of example only, with reference to the accompanying drawings, in which:

FIG. 1 is a top view of a three sided insert of the present invention; and

FIG. 2 is a side elevation of the three sides of a positive rake insert showing the overlapping wiping action of lands.

DETAILED DESCRIPTION OF THE INVENTION

The present invention provides an indexable, positive rake insert for a cutting tool comprising, a body having two spaced-apart substantially parallel side faces, the first side face having a surface larger than the second side face with the faces being substantially triangular. The three contiguous edge faces are of equal length and extend between the side faces with each edge face having one or more recesses which extend transversely or substantially transversely across the whole edge face from the first side face to the second side face. The recesses are spaced apart to leave a plurality of coplanar lands with the number of recesses on any two adjacent edge faces being the same. Three cutting edges are formed where each edge face intersects the first side face, and the recesses at the cutting edge have a width which is the same as half the width or less than half the width, of the intervening lands at the cutting edge. The lands on at least one side are positioned such that a complete cutting edge is formed with the land on other sides. The recesses widen as they extend away from the cutting edge, and correspondingly, the lands become narrower as they extend away from the cutting edge.

FIG. 1 shows a positive rake insert 10, for example, made of tungsten carbide. Insert 10 has a body with two spaced-apart side faces 60 and 62. In FIG. 1, only side face 60, the larger of the two side faces is shown. First side face 60 has a surface area larger than the surface area of second side face 62. This configuration provides the positive rake design of the present invention wherein the edge faces 12, 14 and 16 in FIG. 2 are tapered. The angle of taper is less than 90° from a perpendicular line drawn to the first side face (not shown). In preferred embodiments, the taper is about 7° to about 20°, and most preferably, about 10° or 11°. The insert 10 has three contiguous edge faces 12, 14 and 16 of equal length, arranged in the form of a 60° triangle when seen from the top view. Each of edge faces 12, 14 and 16 has three recesses 18, 20 and 22; 24, 26 and 28; and 30, 32 and 34. Each of the three recesses has two lands 36, 38; 40, 42; and 44, 46; respectively, between the recesses. Since the insert being described is a positive rake insert, only the edges on the larger of the side faces, that is side face 60, are used for cutting. As shown in FIG. 2, these are designated as cutting edges 48, 50 and 52.

The recesses 18, 20 and 22 are arranged at uniform intervals along the length of the edge face 12. The recesses 18, 20 and 22 are of substantially arcuate cross-section. The effect of these recesses 18, 20 and 22 is to interrupt the respective edge faces. The length of each of these interruptions or recesses 18, 20 or 22, is substantially the same as half or less than half the width of the lands 36 and 38 when measured along the cutting edge presented to the workpiece. Similar considerations apply to edge face 14 in relation to the recesses 24, 26 and 28, and intervening lands 40 and 42, as well as edge face 16 with the recesses 30, 32 and 34 and the intervening lands 44 and 46.

As shown in FIG. 2, the inter-relationship of the recesses and the lands is important to ensure complete wiping of the stock as subsequent inserts are passed over the stock. Providing adjacent inserts in a cutter body have a different edge face presented to the workpiece than the preceeding or following insert, then on rotation of the cutter body the stock will be completely wiped without grooving. Thus, as shown in FIG. 2, insert 10 has the cutting edge face 12 and cutting edge 48 presented to the stock whereas insert 10a has edge face 14 and cutting edge 50 presented to the stock and insert 10b has edge face 16 and cutting edge 52 presented to the stock.

It is essential that the recess at the cutting edge has a width which is the same as half the width or less than half the width of the intervening lands of the cutting edge and that each intervening land of any two sides is positioned such that it provides in operation a cutting edge to wipe the material left by the recesses of the third side. To enable this essential feature to be put into effect, the recesses of faces 12, 14 and 16 of the same insert are slightly offset from one another as can be seen in FIG. 2. Thus, the cutting edge 48 will wipe the stock leaving portions uncut by its recesses. Following insert 10a with edge face 50 will have a cutting edge which wipes the stock which was not cut by the preceding insert 10. Similarly, insert 10b will wipe the stock such that a cutting edge 52 wipes the stock left by cutting edge 10b. The recesses in the three sides are positioned such that any two sides can be used to wipe the material left by the recesses in the third side. As shown in FIG. 2, the recesses 18, 20, 22, 24, 26, 28, 30, 32 and 34 are tapered so that the recess widens along the edge faces as it extends away from the cutting edge. This is a preferred feature and can allow swarf to clear the recess when cutting. Thus, the width of the adjacent lands 36, 38, 40, 42, 44 and 46, are tapered. The adjacent land constricts as it extends away from the cutting edge.

In practice, as shown by FIGS. 1 and 2, the inserts are mounted at spaced apart locations on a holder (not shown) being held in place by any conventional means, such as a wedge grip (not shown). The desired out-of-phase relationship of the incremental cutting edges provided by the lands of the inserts allow three inserts to cooperate to define a substantially linear cutting edge, yet each insert does only a proportion of the work of stock removal. Therefore, for a given depth of cut, the load on each cutting edge is reduced, leading to a reduction or avoidance of shock or vibration on the cutting edges, and a reduction in power consumption and a reduction in heat generated.

It is clear from the foregoing discussion that the inserts of the present invention are not limited to those having three recesses on each edge face or in each cutting edge, and one skilled in the art can adapt the present invention to any plurality of recesses and lands in the edge faces as long as the number of recesses on any two adjacent edge faces is the same.

As indicated above, when an insert is placed in a holder in a milling cutter, the insert, by itself, produces a cut on a work piece which leaves a plurality of ridges. This effect is overcome by causing two inserts to cooperate so that the lands of a second insert remove the ridges left by the recesses of the first insert and the like. As seen in FIG. 2, land 42 of insert 10a would remove the ridge left by recess 20 of insert 10; land 40 of insert 10a would remove the ridge left by recess 18 of insert 10; lands 36 and 38 of insert 10 would remove the ridges left in the workpiece by recesses 26 and 28, respectively, of insert 10a. Lands 44 and 46 of insert 10b would remove the ridges left by recesses 24 and 26, respectively, of insert 10a, etc. Accordingly, in accordance with the present invention, it is possible to utilize two or more inserts to provide an overall surface finish in a workpiece.

In operation, the inserts are mounted at spaced-apart locations on a holder or on the milling cutter and are held in place by any conventional means well known in the art. The desired out-of-phase relationship of the cutting edges having the positive rake in addition to the specified spacing and configuration of the recesses of the present invention, result in a reduction or avoidance of shock on the cutting edges as well as increased reduction and power consumption and heat generation over the insert configurations of the prior art.

One of the advantages of the present invention is that it allows for a triangular insert to be easily indexable by an operator. As long as the operator ensures that each adjacent insert has an overlapping cutting edge to the recess on the adjacent insert, then satisfactory cutting of the stock can occur. Any number of inserts greater than one may be used. For example, four inserts (or two, three, five or eight, and the like) may be used such that any of the edges of any adjacent insert is out-of-phase with the preceding insert. This indexing of inserts can be ascertained by inspection by the operator.

Although the present invention has been described with reference to the foregoing specification, many modifications, combinations and variations of the invention will be apparent to those skilled in the art in light of the above teachings. It is therefore understood that changes may be made to the particular embodiments of the invention, which are within the full intended scope of the invention as defined by the following claims.

What is claimed is:

1. An indexable, positive rake insert for a cutting tool comprising:
    a body having two spaced-apart substantially parallel side faces, the first side face having a surface larger than the second side face, the faces being substantially triangular;
    three contiguous edge faces of equal length extending between the side faces, each edge face having one or more recesses which extend transversely or substantially transversely across the whole edge face from the first side face to the second side face, the recesses being spaced apart to leave a plurality of coplanar lands, the number of recesses on any two adjacent edge faces being the same;
    three cutting edges formed where each edge face intersects the first side face, the recesses at the cutting edges having a width which is the same as half the width or less than half the width, of the intervening lands at the cutting edge, the lands on at least one side being positioned such that a complete cutting edge is formed with the lands on at least one other side.

2. The insert as claimed in claim 1, wherein the recesses widen as they extend away from the cutting edge.

3. The insert as claimed in claim 1, wherein each of the recesses is of increasing arcuate cross-section perpendicular to its axis.

4. The insert as claimed in claim 1, wherein each edge face has three recesses and the width of the recesses is half the width of the intervening lands.

5. The insert as claimed in claim 4, wherein the recesses widen as they extend away from the cutting edge.

6. The insert as claimed in claim 4, wherein each of the recesses is of increasing arcuate cross-section perpendicular to its axis.

7. The insert as claimed in claim 1, wherein each intervening land at the cutting edge of any two sides is positioned such that it provides, in operation, a cutting edge to wipe the material left by the recesses of the third side.

8. The insert as claimed in claim 1, wherein the edge faces are tapered at an angle of less than 90° from a perpendicular line drawn to the first side face.

9. The insert as claimed in claim 9, wherein the angle is about 7° to about 20°.

10. An indexable, detachable positive rake insert for a cutting tool having three contiguous edge faces of equal length and two side faces, each edge face having one or more recesses, which extend across the whole of the edge face and which extend transversely or substantially transversely to a cutting edge formed where each edge face meets one of the side faces of the insert, the recesses being spaced apart to leave a plurality of coplanar lands, the number of recesses on any two adjacent edge faces being the same, the recess at the cutting edge have a width which is the same as half the width or less than half the width, of the intervening lands at the cutting edge, each intervening land of any two sides being positioned such that it provides, in operation, a cutting edge to wipe the material left by the recesses of the third side.

11. The insert as claimed in claim 10, wherein each edge face has three recesses and the width of the recesses is half the width of the intervening lands.

12. The insert as claimed in claim 10, wherein the recesses widen as they extend away from the cutting edge.

13. The cutting insert as claimed in claim 10 in which each of the recesses is of increasing arcuate cross-section perpendicular to its axis.

* * * * *